United States Patent
Fraley, Jr. et al.

(10) Patent No.: US 6,960,145 B2
(45) Date of Patent: Nov. 1, 2005

(54) BELT TENSIONER FOR ELECTRIC POWER STEERING UNIT

(75) Inventors: Richard R. Fraley, Jr., Shelby Township, MI (US); Mark Joseph Bugosh, Sterling Heights, MI (US); William Albert Konior, Clinton Township, MI (US)

(73) Assignee: TRW, Inc., Cleveland, OH (US)

( * ) Notice: Subject to any disclaimer, the term of this patent is extended or adjusted under 35 U.S.C. 154(b) by 0 days.

(21) Appl. No.: 10/231,707

(22) Filed: Aug. 30, 2002

(65) Prior Publication Data

US 2004/0043854 A1 Mar. 4, 2004

(51) Int. Cl.$^7$ .............................. B62D 5/04; F16H 7/08
(52) U.S. Cl. ...................................... 474/134; 180/444
(58) Field of Search ................................ 474/111, 140, 474/134, 135, 138; 180/444, 430, 425; 74/388 PS, 422, 89.23

(56) References Cited

U.S. PATENT DOCUMENTS

| | | | | |
|---|---|---|---|---|
| 976,115 A | * | 11/1910 | Bared | 474/134 |
| 2,639,623 A | * | 5/1953 | Ausherman | 474/134 |
| 2,954,726 A | * | 10/1960 | Edward | 474/134 |
| 3,887,026 A | * | 6/1975 | Allison | 180/425 |
| 3,983,953 A | | 10/1976 | Bayle | |
| 4,069,719 A | * | 1/1978 | Cancilla | 474/134 |
| 4,415,054 A | | 11/1983 | Drutchas | |
| 4,741,408 A | | 5/1988 | Bausch et al. | |
| 4,753,310 A | | 6/1988 | Hashimoto | |
| 4,825,972 A | | 5/1989 | Shimizu | |
| 5,002,519 A | | 3/1991 | Oshima et al. | |
| 5,732,791 A | | 3/1998 | Pinkos et al. | |
| 6,155,376 A | | 12/2000 | Cheng | |
| 6,454,044 B1 | * | 9/2002 | Menjak et al. | 180/444 |
| 6,644,432 B1 | * | 11/2003 | Yost et al. | 180/444 |

FOREIGN PATENT DOCUMENTS

| | | |
|---|---|---|
| EP | 0 101 579 | 2/1984 |
| JP | 62004673 | 1/1987 |
| WO | 01/15959 | 3/2001 |

* cited by examiner

*Primary Examiner*—Thomas R. Hannon
(74) *Attorney, Agent, or Firm*—MacMillan, Sobanski & Todd, LLC

(57) ABSTRACT

The invention relates to a tensioning device for use in vehicle power steering assembly, in particular, having a drive unit for rotating an input pulley rotatably connected to an output pulley via a flexible belt. The tensioning device includes a housing and an arm movably attached relative to the housing. A contact device is mounted on the arm and is adapted to be engaged with a portion of the belt between the input and output pulleys. The arm is movable relative to the belt to position the contact device against the belt to provide tension on the belt.

7 Claims, 4 Drawing Sheets

US 6,960,145 B2

BELT TENSIONER FOR ELECTRIC POWER STEERING UNIT

BACKGROUND OF THE INVENTION

This invention relates in general to vehicle power steering systems, and in particular to a belt tensioner for use with an electric power steering system.

Virtually all vehicles include steering systems in which the driver of the vehicle turns the vehicle wheels via rotation of a steering wheel. Sometimes, rotation of the steering wheel rotates a steering column which is connected to a steering gear assembly. The steering gear assembly is coupled to the vehicle wheels. Rotation of the steering wheel to adequately turn the vehicle may be difficult depending on various factors, such as the speed of the vehicle and the mechanical coupling of the steering system. Therefore, many vehicles include power assisted steering systems which assist the driver in steering the vehicle.

One traditional steering system includes hydraulic components, such as valves and cylinders, which apply a hydraulic force to the steering gear assembly to assist in turning the vehicle wheels. Movement of the steering column actuates the valves and cylinders to apply an appropriate amount of assisting force.

Another type of power steering system is an electric power steering system in which the assisting force is derived from the output of an electric motor. A sensor is connected to the steering wheel or steering column to determine the desired assisted force which is delivered by the electric motor. The electric power steering system may be configured such that the output of the electric motor acts upon the steering wheel column or components of the steering gear assembly to provide the assisting force.

Many different drive mechanisms can be used to transfer the output of the electric motor to the steering gear assembly. For example, some systems use direct gear drive mechanisms in which the output shaft of the electric motor is coupled to a pinion gear which is in meshed engagement with one or more gears connected to the steering gear assembly. Another method is to use a couple of pulleys connected together by a flexible belt or chain. One pulley is connected to the output of the electric motor, and the other pulley is connected to the steering gear assembly. Although the use of a flexible belt is generally sufficient, under certain conditions such as abrupt directional changes and sudden rotational movements, portions of the belt may slacken and possibly slip relative to the pulleys.

BRIEF SUMMARY OF THE INVENTION

This invention relates to a belt tensioner for use with an electric power steering system. In particular, the power steering system includes a drive unit, such as an electric motor, for rotating an input pulley rotatably connected to an output pulley via a flexible belt. The tensioning device includes a housing and an arm movably attached relative to the housing. A contact device, such as a roller, is mounted on the arm and is adapted to be engaged with a portion of the belt between the input and output pulleys. The arm is movable relative to the belt to position the contact device against the belt to provide tension on the belt. Preferably, the tensioner includes a spring which biases the contact device against the belt.

Various objects and advantages of this invention will become apparent to those skilled in the art from the following detailed description of the preferred embodiment, when read in light of the accompanying drawings.

DETAILED DESCRIPTION OF THE INVENTION

Figure 1:
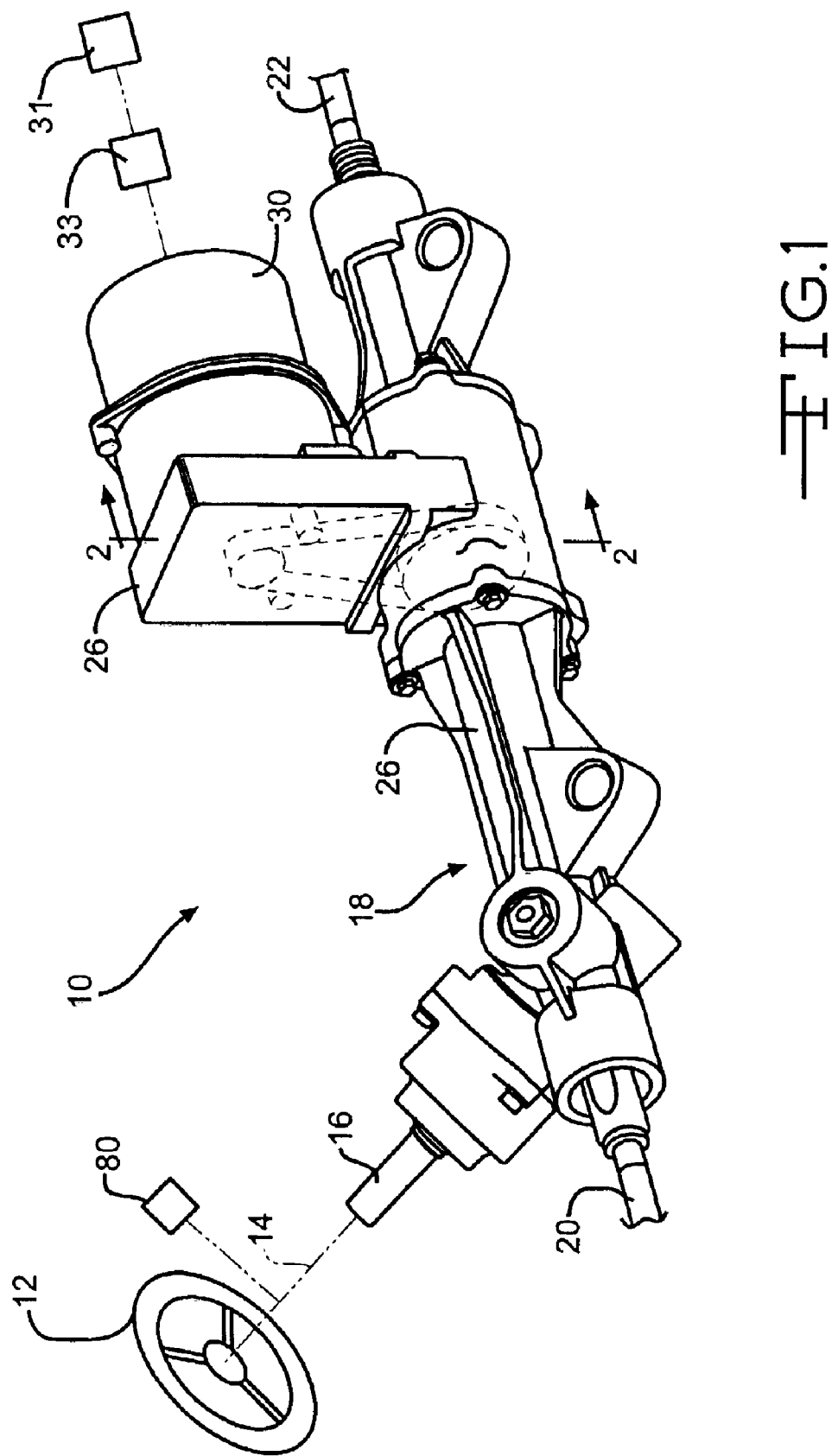
FIG. 1 is a perspective view of an electric power steering system.

Referring now to the drawings, there is illustrated in FIG. 1 an electric power steering system, indicated generally at 10. The system 10 includes a steering wheel 12 operated by the driver of the vehicle. The steering wheel 12 is connected to an end of a steering column, indicated schematically at 14. Rotation of the steering wheel 12 rotates the steering column 14. The other end of the steering column 14 is connected to an input shaft 16 of a steering gear assembly, indicated generally at 18. The steering gear assembly 18 transfers rotational movement of the input shaft 16 into linear movement of tie rods 20 and 22 extending from ends of the steering gear assembly 18. The tie rods 20 and 22 are connected to vehicle wheels (not shown) such that linear movement of the tie rods causes steering rotation of the wheels.

The steering gear assembly 18 can be any suitable mechanism for converting the rotational movement of the input shaft 16 into linear movement of the tie rods 20 and 22. One such example of a suitable steering gear assembly is shown and described in U.S. Pat. No. 6,155,376 to Cheng, which is incorporated by reference herein. The tie rods 20 and 22 are connected to a steering member 24, as shown in cross section in FIG. 2, which translates within a bore formed in a housing 26 of the steering gear assembly 18. The steering member 24 includes a rack portion (not shown) having a series of rack teeth formed therein which meshingly engage with a pinion gear (not shown) coupled to the input shaft 16. Rotation of the pinion gear moves the rack portion of the steering member 24 in a linear direction. Movement of the steering member 24 causes linear movement of the tie rods, thereby rotating the wheels. The steering member 24 preferably includes a screw portion located at the cross-sectional position of FIG. 2. The screw portion includes an external thread convolution, the reason for which will be explained below.

The assembly 10 further includes a drive unit, such as an electrical motor 30. As will be described in detail below, the drive unit effects axial movement of the steering member 24 to provide an assisting force in addition to the manual force input from the driver via the steering wheel 12, the steering column 14, and the steering gear assembly 18. In the event of the inability of the electric motor 30 to effect axial movement of the steering member 24, the mechanical connection between the input member 16 and the steering member 24 permits manual steering of the vehicle. The motor 30 is connected to an electrical power source 31 via a controller 33. The power source 31 can be any suitable power source such as the vehicle's battery or the electrical charging system. The motor 30 is actuated and controlled by the controller 33 for providing the desired rotational speed and rotational direction of the output shaft of the motor 30. The controller 33 can be any suitable mechanism, such as a microprocessor, which can vary the speed of the motor 30 as well as the rotational direction of the motor 30 corresponding to the steering direction of the wheels.

Figure 2:
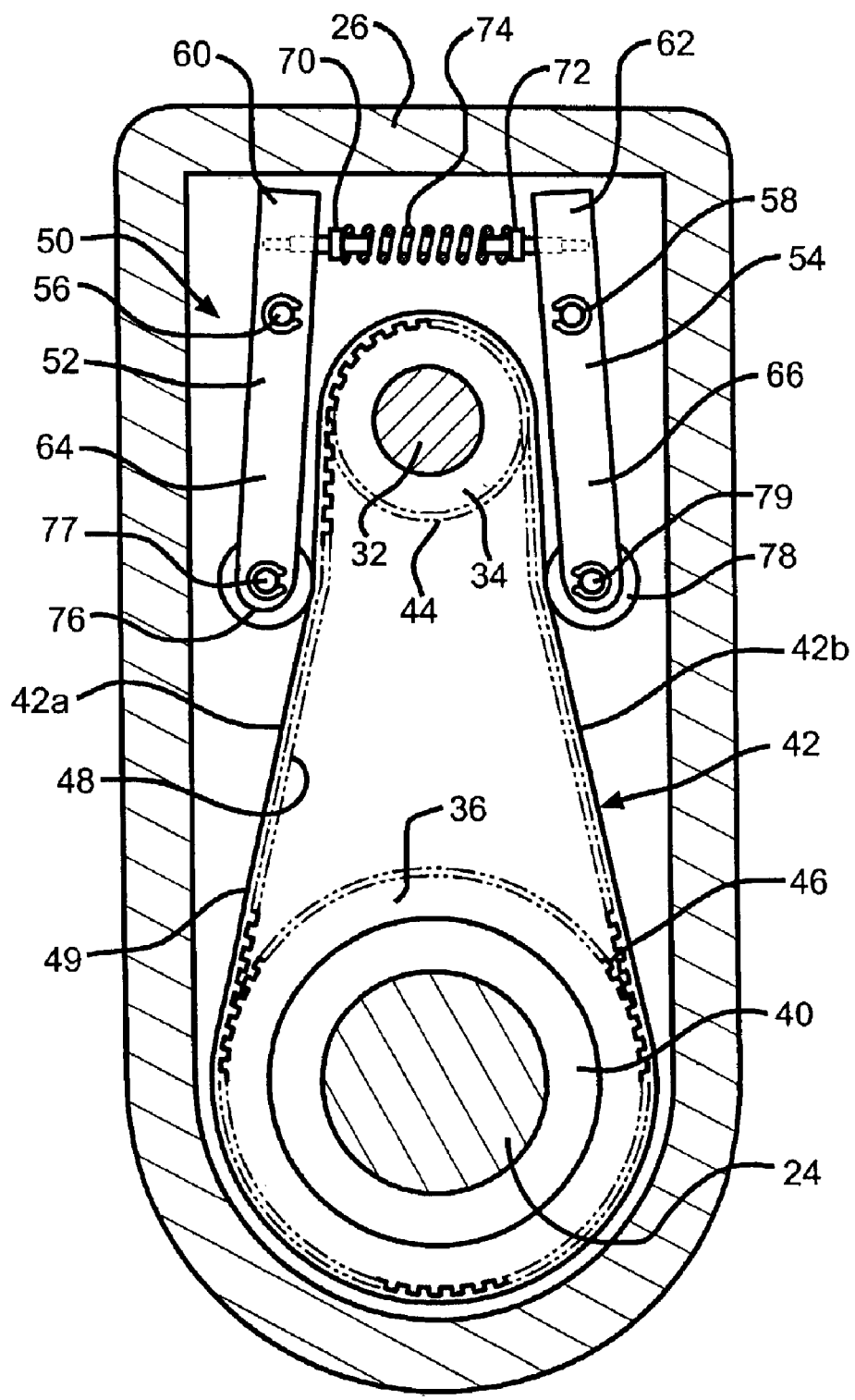
FIG. 2 is a cross-sectional view taken along lines 2—2 of FIG. 1 illustrating a first embodiment of a tensioner, in accordance with the present invention.

As best shown in FIG. 2, the motor 30 includes an output shaft 32 rotatably coupled to an input pulley 34. An output pulley 36 is rotationally engaged with a ball nut assembly, indicated schematically at 40. The ball nut assembly 40 is rotationally engaged with the screw portion of the steering member 24. The ball nut assembly 40 can be any suitable ball nut assembly, such as that described in U.S. Pat. No. 6,155,376, which is incorporated by reference herein.

The pulleys 34 and 36 are rotatably connected to each other via a flexible belt 42. Each of the pulleys 34 and 36 has an outer cylindrical surface 44 and 46, respectively, which engages an inner face 48 of the belt 42. The surfaces 44 and 46 of the pulleys 34 and 36 and the inner face 48 of the belt 42 can have any suitable contour or texture to help ensure a gripping contact between the belt 42 and the pulleys 34 and 36. For example, as shown in FIG. 2, the surfaces 44 and 46 of the pulleys and the inner face 48 of the belt 42 can include toothed mating notches formed therein. The belt 42 is preferably fit relatively snugly about the outer circumferences of the pulleys 34 and 36. Thus, rotational movement of the input pulley 36 causes rotation of the output pulley 36. The diameters of the pulleys 34 and 36 can be any suitable dimension for providing any desired "gear ratio", such that the rotational speed of the input pulley 34 is different from the rotational speed of the output pulley 36. As shown in FIG. 2, the looping of the belt 42 about the input pulley 34 and the output pulley 36 define two unsupported sides 42a and 42b thereof extending between the pulleys 34 and 36. The term "unsupported side" refers to portions of the belt 42 which are not in contact with the pulleys 34 and 36.

The belt 42 can be made of any suitable material flexible enough to loop around the pulleys 34 and 36 and maintain engagement with the outer surfaces of the pulleys 34 and 36 during rotation thereof. For example, the belt 42 may be made of an elastomeric material, and may even include internal metallic reinforcing members. Alternatively, the belt 42 may be made of individual links forming a chain.

The system 10 preferably further includes a first embodiment of a tensioner, indicated generally at 50, in accordance with the present invention. The tensioner 50 preferably includes a pair of arms 52 and 54. The arms 52 and 54 are pivotally mounted on the housing 26 of the steering gear assembly 18 by pivot pins 56 and 58, respectively. The pivot pins 56 and 58 define pivot axes about which the arms pivot relative to the housing 26. Each arm 52 and 54 includes an upper portion 60 and 62, respectively, and lower portions 64 and 66, respectively, separated by the pivot pins 56 and 58. Each of the upper portions 64 and 66 include a retainer pin 70 and 72, respectively, extending toward one another. A helical coil spring 74 extends between the upper portions 60 and 62. The ends of the spring 74 are retained by the retainer pins 70 and 72. The coil spring 74 is under a compressive load and exerts a force against the retainer pins 70 and 72 in a direction towards the upper portions 60 and 62. As viewing FIG. 2, the spring 74 biases the left-hand arm 52 in a counter-clockwise direction about the pivot pin 56. The spring 74 also biases the right-hand arm 54 in a clockwise direction about the pivot pin 58.

Each of the lower portions 64 and 66 of the arms 52 and 54 preferably includes a contact device which engages the unsupported sides 42a and 42b of the belt 42 between the input pulley 34 and the output pulley 36. Preferably, the contact device is a roller which rollingly engages an outer face 49 of the belt 42. Of course, the contact device need not be a roller but can be a static smooth surface, such as an end surface of the arm, which is slidingly engaged with the outer face 49 of the belt 42. As shown in FIG. 2, the arm 52 includes a roller 76 rotatably mounted on the lower portion 64 about a pivot pin 77. The arm 54 includes a roller 78 rotatably mounted on the lower portion 66 about a pivot pin 79.

In operation of the steering system 10, when the driver desires to steer the vehicle, the driver turns the steering wheel 12 in the appropriate direction. Rotation of the steering wheel 12 rotates the steering column 14 which causes rotation of the input shaft 16. Rotation of the input shaft 16 causes linear movement of the steering member 24, as described above. Linear movement of the steering member 24 causes linear movement of the tie rods 20 and 22, thereby, turning the vehicle wheels.

To provide an assisting force to the steering gear assembly 18, the system includes a torque sensor 80 preferably coupled to the steering column 14 or the input shaft 16. The torque sensor 80 senses the rotational direction and torque exerted on the steering column 14 via manual rotation of the steering wheel 12 by the driver. For example, the torque sensor 80 can be a strain gauge for detecting the torsional force exerted on the steering column 14 or the input shaft 16. The torque sensor 80 provides an electrical signal corresponding to the rotational direction and torque and transmits this signal to the controller 33. The controller 33 controls the motor 30 to rotate the output shaft 32 in the rotational direction and speed corresponding to the signal provided by the torque sensor 80. Rotation of the output shaft 32 rotates the input pulley 34 which rotates the output pulley 36 via the belt 42. Rotation of the output pulley 36 causes the ball nut assembly 40 to engage the screw portion of the steering member 24 to provide an input force to the steering member 24, thereby providing an appropriate assisting force.

Since the belt 2 is generally flexible, initial movement or abrupt speed changes in the belt 42 may tend to slacken one or both of the unsupported sides 42a and 42b. Also, the belt 42 may in time stretch, thereby causing an undesirable amount of slack in the unsupported sides 42a and 42b. Slackened portions of the belt 42 may cause undesirable slippage between the belt 42 and the pulleys 34 and 36. The tensioner 50 helps to prevent slippage by providing tension on the unsupported sides 42a and 42b of the belt 42. Because of the pivoting connection of the arms 52 and 54, the arms 52 and 54 are movable relative to the belt 42 to position the rollers 76 and 78 against the unsupported sides 42a and 42b, respectively, to provide tension on the belt 24. The spring 74 provides a biasing force to maintain the rollers 76 and 78 against the belt 42.

It should be understood that a single arm having a single contact device engaged with only one of the unsupported sides 42a or 42b of the belt 42 may be used to practice the invention. However, it is preferred that the tensioner 50 include two contact devices, one for each unsupported side 42a and 42b. One of the reasons for this is that an abrupt change in speed of the belt 42 may cause momentary slack in only one of the unsupported sides 42a or 42b. Thus, if only one contact device were used on one unsupported side of the belt, the other unsupported side may momentarily have an undesirable amount of slack, thereby causing slippage of the belt. Another reason for providing contact devices on both unsupported sides 42a and 42b is that if a toothed belt 42 were used, providing a tension force on only one unsupported side may not provide tension on the other side due to the toothed contact between the pulleys 34 and 36 and the belt 42.

Figure 3:
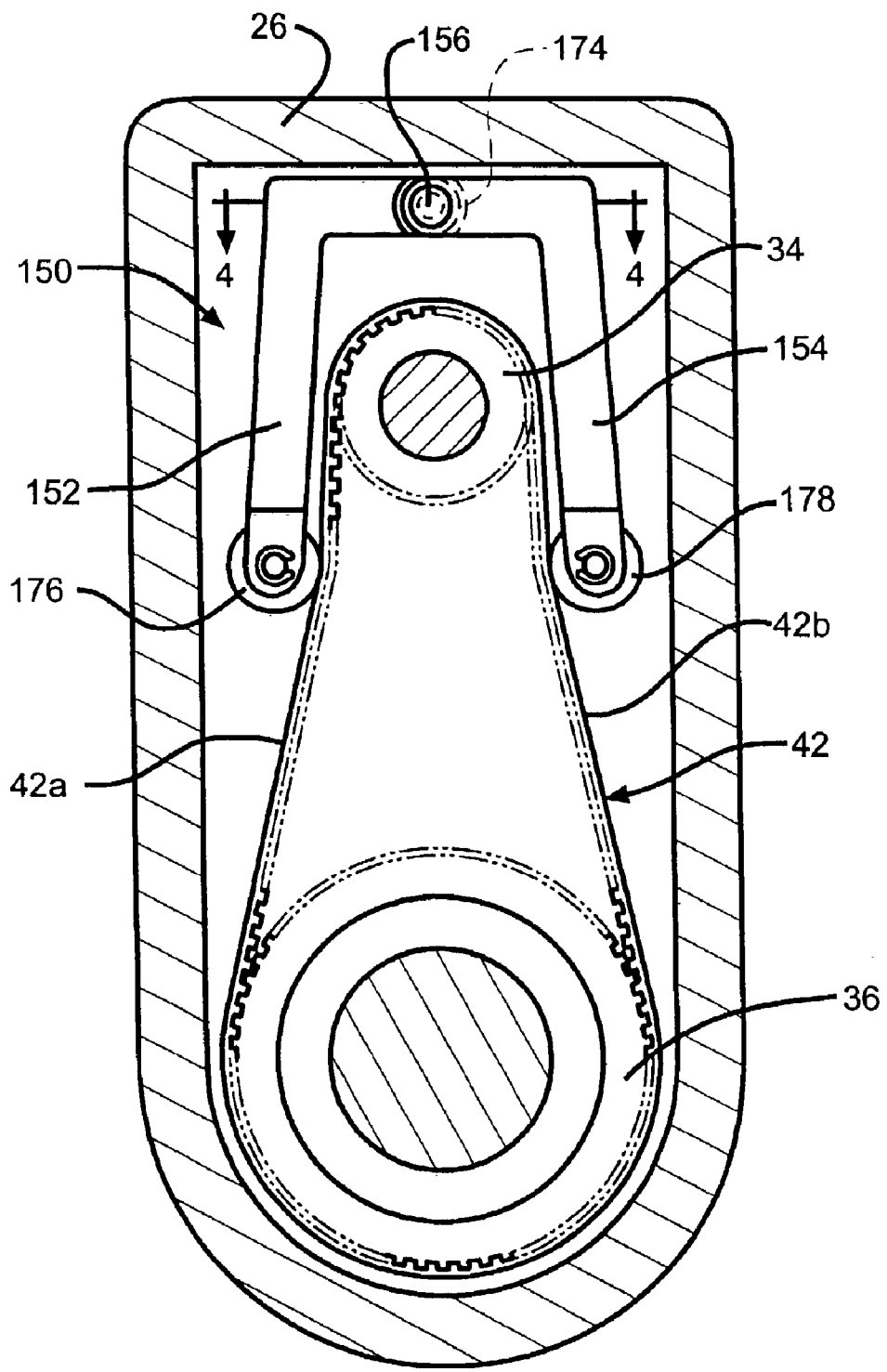
FIG. 3 is a cross-sectional view of a second embodiment of a tensioner.
Figure 4:
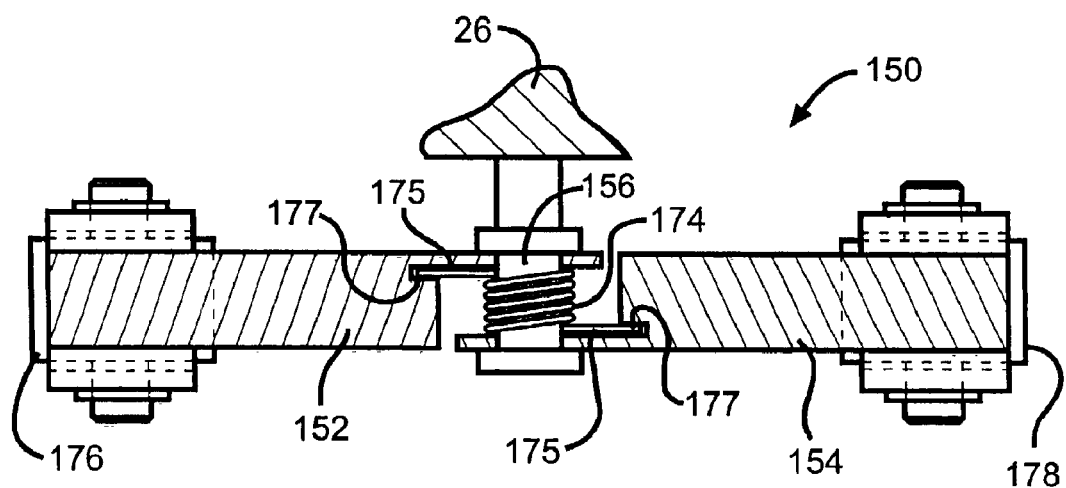
FIG. 4 is a cross-sectional view taken along lines 4—4 of FIG. 3.

It should also be understood that instead of using a single spring 74 to bias both of the arms 52 and 54, two separate springs could be used. Furthermore, any suitable spring structure can be used for biasing the arms 52 and 54 into a position such that the contact device abuts against the belt 42 to provide tension on the belt 42. For example, there is illustrated in FIGS. 3 and 4 a second embodiment of a tensioner, indicated generally at 150 having a single coil spring 174. The tensioner 150 is similar in function to the tensioner 50 as shown in FIG. 2, and as such, similar 100 series and 10 series numbers indicate similar features.

The tensioner 150 includes a pair of inverted L-shaped arms 152 and 154. The arms 152 and 154 are pivotally mounted on the housing 26 by a common pivot pin 156. Thus, the arms 152 and 154 are pivotally mounted relative to the housing 26 at the same pivoting axis. The pin 156 is preferably fixed relative to the housing 26. The arms 152 and 154 include rollers 176 and 178, respectively, which engage the unsupported portions 42a and 42b of the belt 42.

The tensioner 150 preferably includes the torsion spring 174. The central portion of the spring 174 is wrapped or coiled around the pin 156. The ends of the spring 174 define tangs 175. The tangs 175 extend into apertures 177 formed in the arms 152 and 54. The spring 174 biases the arms 152 and 154 such that the rollers 176 and 178 are engaged with the unsupported portions 42a and 42b, thereby providing tension in the belt 42. As viewing FIG. 3, the spring 174 biases the left-hand arm 152 in a counter-clockwise direction about the pivot pin 156. The spring 174 also biases the right-hand arm 154 in a clockwise direction about the pivot pin 156.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A tensioner apparatus for a vehicle power steering assembly having a drive unit for rotating an input pulley rotatably connected to an output pulley via a flexible belt, said tensioner apparatus comprising:
   a housing;
   first and second arms movably attached relative to said housing, wherein each of the arms are pivotally mounted to said housing at respective pivot points located between first and second ends of said arms;
   a first contact device mounted on said second end of said first arm and adapted to be engaged with a first portion of the belt between the input and output pulleys;
   a second contact device mounted on said second end of said second arm and adapted to be engaged with a second portion of the belt different from the first portion of the belt; and
   a single common spring positioned between said first ends of said first and second arms such that said spring exerts a force against said first ends of said first and second arms biasing said first ends away from one another, thereby causing said arms to rotate in different rotational directions to move said first and second contact devices in a direction towards one another and against the respective first and second portions of the belt to provide tension on the belt.

2. The tensioner apparatus of claim 1, wherein the spring is a coil spring.

3. The tensioner apparatus of claim 1, wherein said contact device is a roller rotatably mounted on said arm, and wherein said roller rotatably engages the belt.

4. A tensioner apparatus for a vehicle power steering assembly having a drive unit for rotating an input pulley rotatably connected to an output pulley via a flexible belt, said tensioner apparatus comprising:
   a housing;
   first and second arms movably attached relative to said housing;
   a first contact device mounted on said first arm and adapted to be engaged with a first portion of the belt between the input and output pulleys; and
   a second contact device mounted on said second arm and adapted to be engaged with a second portion of the belt different from the first portion of the belt, wherein said first and second arms are pivotally mounted on said housing at a common pivot point; and
   a single common torsion spring mounted about said pivot point having first and second tang ends, wherein said first tang end biases said first arm in a first rotational direction, and biases said second arm in a second rotational direction opposite said first rotational direction, thereby causing said arms to rotate in different rotational directions to move said first and second contact devices in a direction towards one another and against the respective first and second portions of the belt to provide tension on the belt.

5. The tensioner apparatus of claim 4, wherein said arms are pivotally mounted relative to-said housing at different pivoting axes.

6. The tensioner apparatus of claim 4, wherein said arms are pivotally mounted relative to said housing at the same pivoting axis.

7. A vehicle power steering assembly comprising:
   a drive unit baying an output shaft;
   an input pulley operatively connected to said output shaft;
   an output pulley connected to a steering gear assembly;
   a flexible belt rotatably connected with said input and output pulleys; and
   a tensioner apparatus including:
      a housing;
      first and second arms pivotally attached relative to said housing, wherein each of the arms are pivotally mounted to said housing at respective pivot points located between first and second ends of said arms; and
      a first contact device mounted on said second end of said first arm and adapted to be engaged with a first portion of the belt between the input and output pulleys; and
      a second contact device mounted on said second end of said second arm and adapted to be engaged with a second portion of the belt different from the first portion of the belt; and
      a single common spring engaging said first ends of said first and second arms such that said spring exerts a force against said first ends of said first and second arms biasing said first ends away from one another, thereby causing said arms to rotate in different rotational directions to move said first and second contact devices in a direction towards one another and against the respective first and second portions of the belt to provide tension on the belt, and wherein said first and second arms are pivotally mounted such that one of said first and second arms may pivot independently from said other of said first and second arms caused by biasing of said spring.

* * * * *